United States Patent
Staelin et al.

(10) Patent No.: US 9,588,715 B2
(45) Date of Patent: Mar. 7, 2017

(54) SCHEDULING REALTIME INFORMATION STORAGE SYSTEM ACCESS REQUESTS

(75) Inventors: Carl Staelin, Haifa (IL); Gidi Amir, Ness Ziona (IL); Ram Dagan, Modiin (IL); David Ben Ovadia, Tel Aviv (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 991 days.

(21) Appl. No.: 13/321,152

(22) PCT Filed: Jun. 3, 2009

(86) PCT No.: PCT/US2009/046179
§ 371 (c)(1),
(2), (4) Date: Nov. 17, 2011

(87) PCT Pub. No.: WO2010/141016
PCT Pub. Date: Dec. 9, 2010

(65) Prior Publication Data
US 2012/0066685 A1    Mar. 15, 2012

(51) Int. Cl.
*G06F 9/46*     (2006.01)
*G06F 3/06*     (2006.01)
*G06F 9/50*     (2006.01)

(52) U.S. Cl.
CPC .......... *G06F 3/0659* (2013.01); *G06F 3/0611* (2013.01); *G06F 3/0676* (2013.01); *G06F 9/5011* (2013.01)

(58) Field of Classification Search
None
See application file for complete search history.

(56) References Cited

U.S. PATENT DOCUMENTS 5,787,482 A    7/1998    Chen
5,812,844 A *  9/1998    Jones et al. .................... 718/104
(Continued)

OTHER PUBLICATIONS

Karlik Gopalan and Tzi-cker Chiueh. Real-time disk scheduling using deadline sensitive SCAN. Technical Report TR-92, Experimental Computer Systems Labs, Dept. of Computer Science, State University of New York, Stony Brook, NY, Jan. 2001. (available online as http://www.ecsi.cs.sunysb.edu/tr/TR92.ps.gz).

(Continued)

*Primary Examiner* — Gregory A Kessler
(74) *Attorney, Agent, or Firm* — HP Inc. Patent Department

(57) ABSTRACT

Access requests (12) that are to be scheduled to an information storage system (18) include realtime access requests and non-realtime access requests. The realtime access requests are associated with respective completion deadlines. Pending ones of the access requests (12) that are awaiting submission to the information storage system (18) are received. Outstanding ones of the access requests (12) that have been submitted to the information storage system (18) and are awaiting completion by the information storage system (18) are tracked. The pending access requests are submitted to the information storage system (18) based on rules that prioritize the submission of pending access requests such that realtime ones of the pending access requests and realtime ones of the outstanding access requests will be serviced by the information storage system (18) by their associated completion deadlines.

20 Claims, 4 Drawing Sheets

(56) References Cited

U.S. PATENT DOCUMENTS

| | | | |
|---|---|---|---|
| 6,021,464 A | | 2/2000 | Yao |
| 6,148,322 A | * | 11/2000 | Sand .................... G06F 9/4837 718/102 |
| 6,378,036 B2 | | 4/2002 | Lerman |
| 6,378,052 B1 | | 4/2002 | Genduso |
| 6,442,648 B1 | | 8/2002 | Genduso et al. |
| 6,496,899 B1 | | 12/2002 | DeMoney |
| 7,085,831 B2 | * | 8/2006 | Larkin ................. G06F 9/4862 709/223 |
| 7,260,703 B1 | | 8/2007 | Moore |
| 7,366,833 B2 | | 4/2008 | Chanda |
| 7,386,692 B1 | | 6/2008 | Moore |
| 2004/0128459 A1 | | 7/2004 | Chanda et al. |
| 2006/0085793 A1 | * | 4/2006 | McKenney ............ G06F 9/526 718/100 |
| 2006/0253675 A1 | | 11/2006 | Johannes Bloks |
| 2007/0089114 A1 | | 4/2007 | McLnnis |
| 2009/0100433 A1 | | 4/2009 | Kang et al. |

OTHER PUBLICATIONS

Lars Reuther and Martin Pohlack. Using SATF in real-time systems. Work-in-Progress Report, 2nd USENIX Conference on File and Storage Technologies (FAST 03), (San Francisco, CA, Mar. 31-Apr. 2, 2003), Mar. 2003. (available online as http://os.inf.tudresden.de/~mp26/publications/fast2003.pdf).

D. M. Jacobson and J. Wilkes. Disk scheduling algorthims based on rotational position, Technical Report HPL-CSP-91-7, HP Labs, 1991. (available online as http://www.hpl.hp.com/research/ssp/papers/HPL-CSP-91-7rev1.pdf).

Alexander Thomasian and Chang Liu. Disk scheduling policies with lookahead. ACM SIGMETRICS Performance Evaluation Review. (30)2, pp. 31-40, Sep. 2002.

Saman Zarandioon and Alexander Thomasian. Optimization of online disk scheduling algorithms. ACM SIGMETRICS Performance Evaluation Review, (33)4, pp. 42-46, Mar. 2006.

Margo Seltzer, Peter Chen, and John Ousterhout, Disk scheduling revisited. proceedings of the Winter 1990 USENIX Technical Conference (Washington, DC, Jan. 22-26, 1990), pp. 313-323. (available online as http://www.eecs.harvard.edu/~margo/papers/usenix90/paper.pdf).

Amber Huffman and Joni Clark. Serial ATA native command queuing. Seagate and Intel joint white paper. Jul. 2003. (available online as http://www.seagate.com/content/docs/pdf/whitepaper/D2c_tech_paper_intc-stx_sata_ncq.pdf).

SCSI Architecture Model—3 (SAM3). T10 Project 1561-D, revision 14. International Committee for Information Technology Standards (INCITS), T10 Technical Committee. Reference ISO/IEC 14776-413-200X. Sep. 2004. (available online as http://www.t10.org/ftp/t10/drafts/sam3/sam3r14.pdf).

* cited by examiner

SCHEDULING REALTIME INFORMATION STORAGE SYSTEM ACCESS REQUESTS

CROSS-REFERENCE TO RELATED APPLICATIONS

This application is a National Stage application of International Application No. PCT/US2009/046179, filed Jun. 3, 2009, the disclosure of which are hereby incorporated by reference in its entirety.

BACKGROUND

Computer applications request read and write access to information storage systems (e.g., computer disk drive systems) in order to perform their respective functions. A variety of different scheduling algorithms have been developed to improve the performance of such information storage systems.

Among the algorithms that are used for scheduling non-realtime access requests are the SCAN algorithm and the Circular SCAN (or C-SCAN) algorithm. The SCAN algorithm involves moving the mechanical arm of a disk based information storage system in alternate directions and servicing all requests that lie in the scan path in each direction. In accordance with the Circular SCAN algorithm, the mechanical arm scans in one direction and, after serving the last request in the SCAN direction, the arm returns to a start position without servicing any requests as it returns.

Among the algorithms that are used for scheduling realtime access requests are the Earliest-Deadline-First (EDF) algorithm, the Feasible-Deadline-SCAN (FD-SCAN) algorithm, and the Deadline Sensitive SCAN (DS-SCAN) algorithm. The EDF algorithm involves selecting the request with the earliest deadline for service. The FD-SCAN algorithm involves using the track location of the request with earliest feasible deadline (i.e., a deadline that can be met) to determine the SCAN direction at each scheduling point. The DS-SCAN algorithm is a hybrid of the traditional EDF and SCAN algorithms that approximates the behavior of the SCAN algorithm, subject to the requirement that completion deadlines of the realtime access requests are met.

What is needed are improved systems and methods of scheduling information storage system access requests.

SUMMARY

In one aspect, the invention features a method of scheduling access requests to an information storage system. The access requests include realtime access requests and non-realtime access requests. The realtime access requests are associated with respective completion deadlines. In accordance with the scheduling method, pending ones of the access requests that are awaiting submission to the information storage system are received. Outstanding ones of the access requests that have been submitted to the information storage system and are awaiting completion by the information storage system are tracked. The pending access requests are submitted to the information storage system based on rules that prioritize the submission of pending access requests such that realtime ones of the pending access requests and realtime ones of the outstanding access requests will be serviced by the information storage system by their associated completion deadlines.

The invention also features apparatus operable to implement the method described above and computer-readable media storing computer-readable instructions causing a computer to implement the method described above.

DETAILED DESCRIPTION

Figure 1:
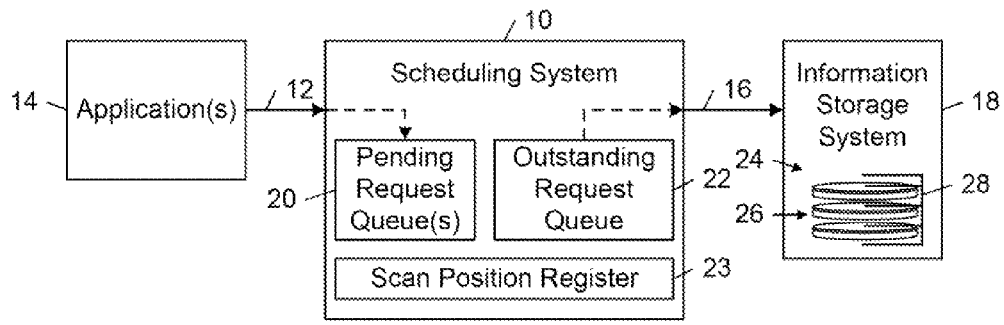
FIG. 1 is a block diagram of an embodiment of a scheduling system.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. An "application" (also referred to as software, a software application, computer software, a computer application, a program, and a computer program) is a set of instructions that a computer can interpret and execute to perform one or more specific tasks.

The term "computer-readable medium" refers to any medium capable carrying information that is readable by a machine (e.g., a computer). Storage devices suitable for tangibly embodying this information include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

An "information storage system" refers to a system that enables storage and retrieval of information from at least one computer-readable medium, which may be located on a single physical data storage device or distributed across multiple physical data storage devices. An example of an information storage system is a disk drive that includes a plurality of parallel computer-readable media disks on which data can be stored and a plurality of parallel read/write heads that move across the disks in order to provide read/write access.

As used herein, an "access request" is any request to access a functionality of an information storage system, including reading data from and writing data to the information storage system. "Pending access requests" are access requests that are awaiting submission to an information storage system. "Outstanding access requests" are access requests that have been submitted to an information storage system and are awaiting completion by the information storage system.

A "realtime access request" is an access request that is associated with a completion deadline, which is an application-specified time by which the realtime access request should be completed. A "non-realtime access request" is an access request that is not associated with a completion deadline.

A "worst-case service time" is an estimate of the maximal amount of time needed before a scheduled access request will be serviced. The worst-case service time typically is pre-measured or determined from the physical parameters of the information storage system.

A "submission deadline" is an estimate of the latest time a realtime access request should be scheduled in order to meet its completion deadline, assuming the worst-case service time.

II. Scheduling Realtime Information Storage System Access Requests

A. Introduction

The embodiments that are described herein provide a realtime information storage system access request scheduling algorithm that allows multiple outstanding access requests to be sent to the device, while still tracking and managing the realtime deadlines and accounting for the time potentially required by outstanding access requests that are still pending at the information storage system. These embodiments can improve the performance of storage array based information storage systems that can service multiple access requests in parallel by proper scheduling of the parallel requests. These embodiments also can improve the performance of information storage systems that support command queuing (e.g., NCQ or TCQ) and utilize efficient disk scheduling algorithms that take into account the rotational position of the storage disk.

FIG. 1 shows an embodiment of a scheduling system 10 that receives input access requests 12 from at least one application 14 and schedules output access requests 16 to an information storage system 18. The scheduling system 10 tracks the input access requests 12 using one or more pending request queues 20. The scheduling system 10 also tracks the output access requests 16 using an outstanding request queue 22. The scheduling system 10 also typically stores in a scan position register 23 one or more current scan positions corresponding to recent ones of the data storage addresses in the information reading/writing path(s) of the information storage system 18.

The information storage system 18 includes at least one disk drive 24 that has an array 26 of parallel magnetic hard disks on which computer-readable data can be stored, and a moving-head disk drive mechanism 28. The data typically is organized on the disks in parallel scan paths (or tracks), which collectively are referred to as cylinders. Each block of data typically is addressed by a respective physical address that includes a cylinder identifier and a disk identifier.

The at least one application 14 sends to the scheduling system 10 read and write access requests that include realtime access requests and non-realtime access requests. The realtime access requests typically are associated with respective completion deadlines and respective target addresses in the information storage system 18, whereas the non-realtime access requests typically are associated with respective target addresses in the information storage system.

Figure 2:
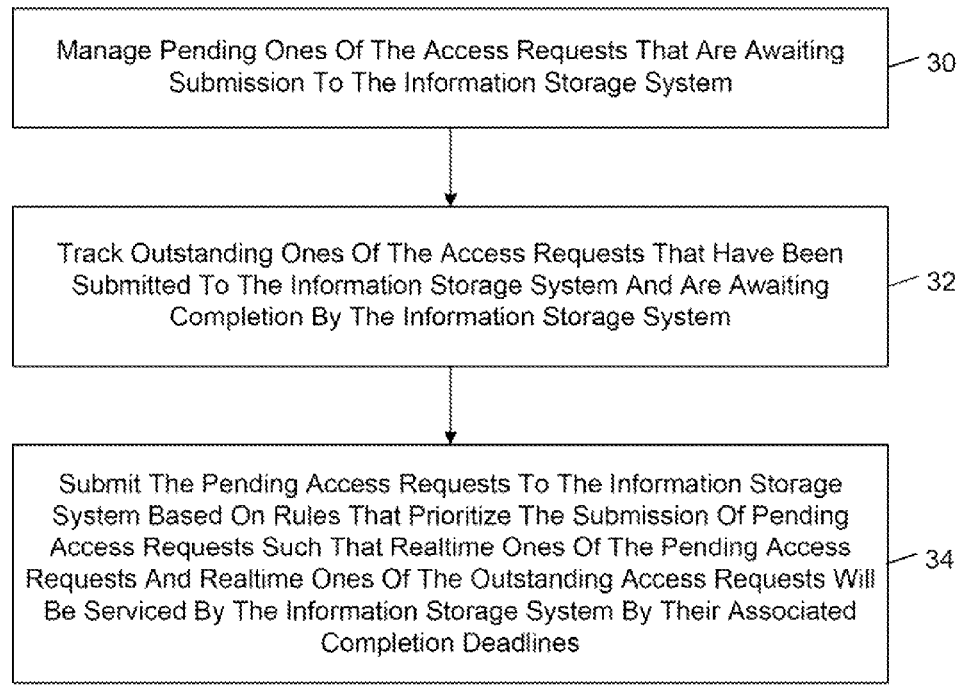
FIG. 2 is a flow diagram of an embodiment of an access request scheduling method.

FIG. 2 shows an embodiment of a method by which the scheduling system 10 schedules access requests to the information storage system 18. In accordance with this method, the scheduling system 10 manages pending access requests that are awaiting submission to the information storage system (FIG. 2, block 30). The scheduling system 10 tracks outstanding ones of the access requests that have been submitted to the information storage system 18 and are awaiting completion by the information storage system 18 (FIG. 2, block 32). The scheduling system 10 submits the pending access requests 12 to the information storage system 18 based on rules that prioritize the submission of pending access requests such that realtime ones of the pending access requests and realtime ones of the outstanding access requests will be serviced by the information storage system 18 by their associated completion deadlines (FIG. 2, block 34).

Various embodiments of the scheduling system 10 that are capable of implementing the elements of the method of FIG. 2 are described detail below in the following sections.

B. Managing Pending Access Requests

The process of managing the pending access requests typically involves accepting the new access requests 12 that are received from the one or more applications 14 into the one or more pending request queues 20, and updating the pending request queues 20 to reflect the submission of pending access requests to the information storage system 18.

Figure 3:
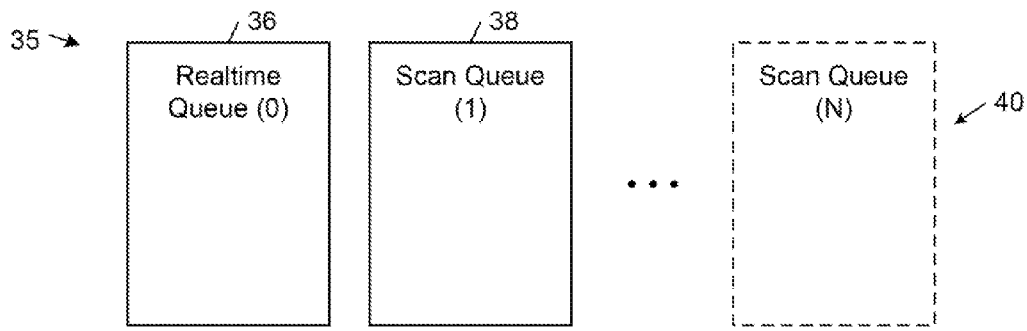
FIG. 3 is a diagrammatic view of an embodiment of a set of access request queues.

In some embodiments, the scheduling system 10 maintains multiple queues of pending access requests, including a realtime queue and at least one scan queue. The realtime queue contains a list of realtime ones of the pending access requests that are sorted primarily by completion deadline and secondarily by target address. Each of the scan queues, on the other hand, contains a respective list of a respective set of the pending access requests sorted by target address. In some embodiments, the scheduling system 10 maintains multiple scan queues that are associated with respective priority level values, which correspond to priority level values that are respectively assigned to the pending access requests by the one or more applications 14. FIG. 3 shows an exemplary set 35 of pending request queues that include a realtime queue 36, a scan queue 38, and N−1 optional scan queues 40 (N has an integer value greater than zero). Each of the queues 36-40 is associated with a respective priority level value ranging from 0 to N, where queue priority decreases with increasing priority level value. For example, the realtime queue 36 is associated with a highest priority level (0), the scan queue 38 is associated with a second highest priority level (1), and so on.

Figure 4:
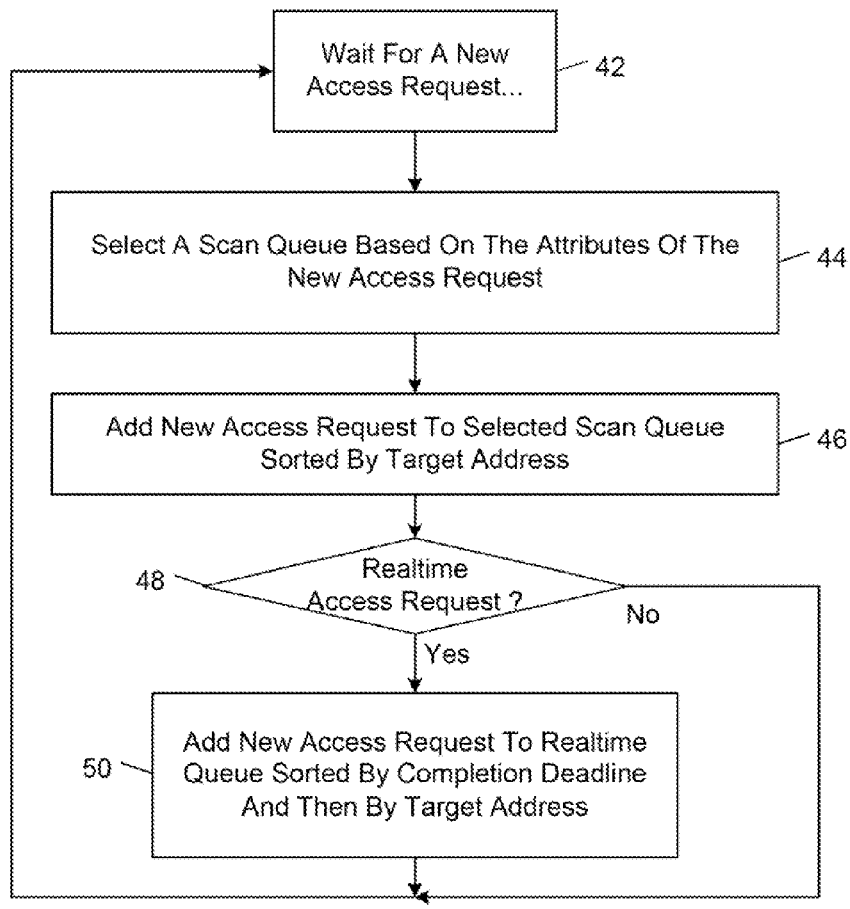
FIG. 4 is a flow diagram of an embodiment of a method of managing access requests.

FIG. 4 shows an embodiment of a method by which the scheduling system 10 manages pending access requests. In accordance with this method, the scheduling system 10 waits for a new access request 12 (FIG. 4, block 42). In response to receipt of a new access request, the scheduling system 10 selects a scan queue based on the attributes of the new access request 12 (FIG. 4, block 44). If the new access request 12 is a realtime access request, the scheduling system 10 selects the highest priority scan queue (e.g., scan queue (1) in FIG. 4). If the new access request is a non-realtime access request, the scheduling system 10 selects the scan queue associated with a priority level that corresponds to the priority level assigned to the new access request 12. If there is only one scan queue, the scheduling system 10 selects that scan queue regardless of the priority level that might be assigned to the new access request. The scheduling system 10 adds the new access request to the selected scan queue sorted by the target addresses associated with the pending access requests that are listed in the selected scan queue (FIG. 4, block 46). If the new access request 12 is a realtime access request (FIG. 4, block 48), the scheduling system 10 adds the new access request to the realtime queue sorted primarily by completion deadline and secondarily by target address (FIG. 4, block 50).

As explained above, each new realtime access request is associated with a respective completion deadline. For each of the pending realtime access requests, the scheduling system 10 calculates a respective submission deadline, which is the latest time the realtime access request should be scheduled in order to meet its completion deadline. The submission deadlines are used in determining whether the pending realtime access requests are in danger of missing their respective completion deadlines. In some embodiments, the submission deadlines are calculated using the following method:

$$\text{Current} = ED_M;$$
$$\text{for } (i=M; i \geq 1; i--) \{$$
$$\quad SD_i = \min(\text{Current}, ED_i) - X_i;$$
$$\quad \text{Current} = SD_i;$$
$$\}$$

where $X_i$ and $ED_i$ are the worst case service time and the completion deadline for the $i^{th}$ access request in the realtime queue 36 (which is sorted by completion deadline in ascending order), $i=\{1,M\}$, and M is the number of realtime access requests. The submission deadline calculation method initially starts with the realtime access request with the largest completion deadline (i.e., $ED_M$). Thereafter, whenever a new realtime access request is added to the realtime queue 36, the submission deadlines of all the realtime access requests with completion deadlines earlier than the completion deadline of the new request are re-calculated using the above-described submission deadline calculation method, except that the method starts with the new realtime access request instead of the realtime access request with the largest completion time. In addition, whenever a pending realtime access request is submitted, the submission deadlines of all the realtime access requests with completion deadlines that are earlier than the submitted request are recalculated using the above-described submission deadline calculation method.

C. Tracking Outstanding Access Requests

The process of tracking the outstanding access requests typically involves logging each of the pending access requests that has been submitted to the information storage system 18 into the outstanding request queue 22. The scheduling system 10 also updates the outstanding request queue 22 to reflect the completion (or servicing) of the outstanding requests by the information storage system 18. In this process, the scheduling system 10 typically removes an outstanding access request from the outstanding request queue in response to receipt of a notification that the outstanding access request has been serviced by the information storage system 18.

D. Submitting Pending Access Requests

The process of submitting the pending access requests typically involves accounting for both the completion deadlines of realtime pending access requests and the completion deadlines of realtime outstanding access requests. In addition, in submitting the pending access request, the scheduling system 10 typically attempts to maximize utilization of the information storage system by pending non-realtime access requests.

Figure 5:
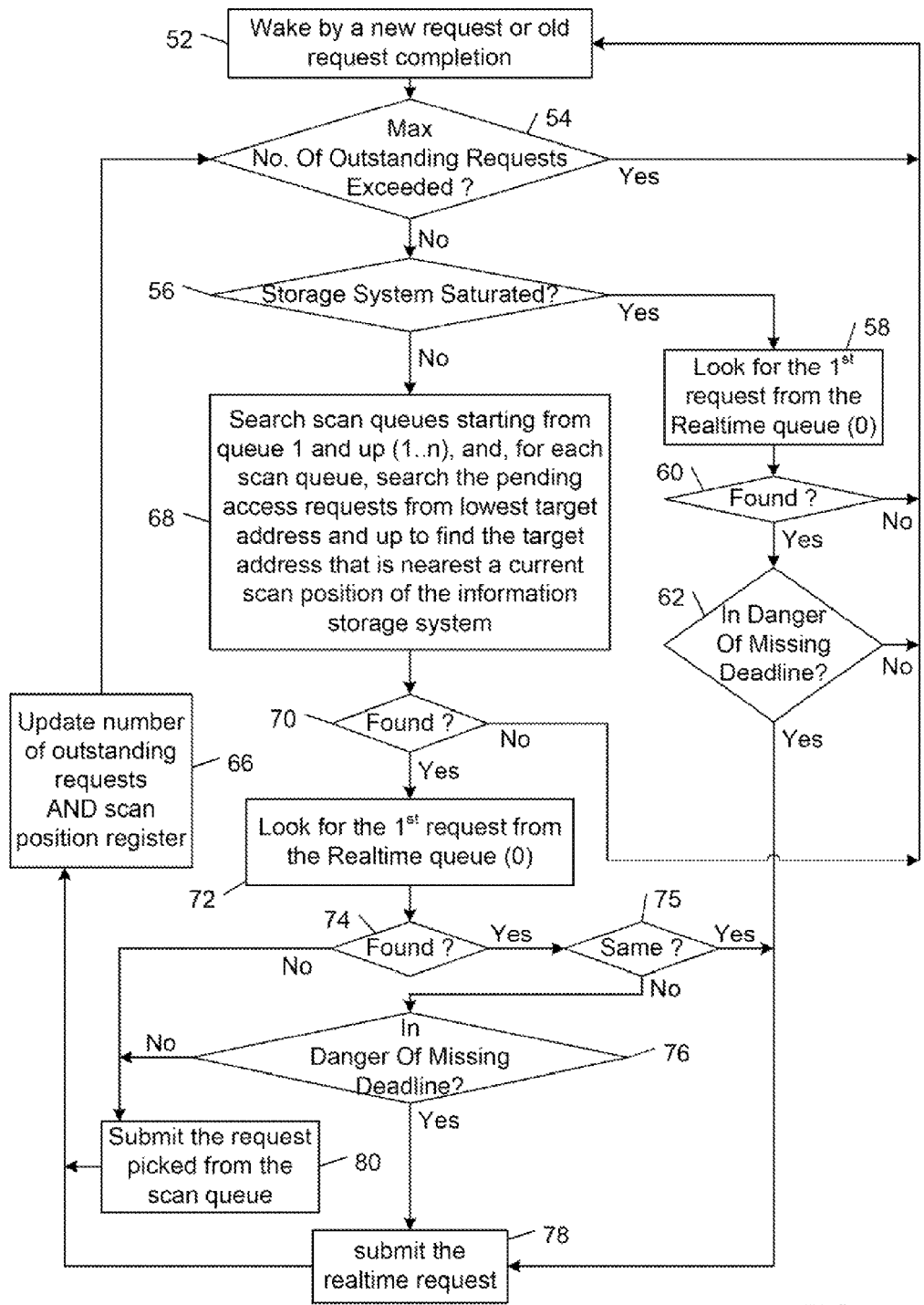
FIG. 5 is a flow diagram of an embodiment of scheduling access requests.

FIG. 5 shows an embodiment by which the scheduling system 10 submits pending access requests to the information storage system 18.

In accordance with the method of FIG. 5, the scheduling system 10 submits a respective one of the pending access requests to the information storage system 18 in response to receipt of either a new pending access request 12 or a notification that a respective one of the outstanding access requests has been serviced by the information storage system 18 (FIG. 5, block 52). If the number of outstanding access requests exceeds a designated maximum number of outstanding access requests (FIG. 5, block 54), the scheduling system 10 returns to block 52.

If the number of outstanding access requests does not exceed the designated maximum number of outstanding access requests (FIG. 5, block 54), the scheduling system 10 determines whether or not the information storage system 18 is saturated (FIG. 5, block 56). The information storage system 18 is considered saturated when the earliest outstanding access request is in danger of not meeting its respective completion deadline. In some embodiments, the scheduling system 10 determines that the information storage system 18 is saturated in response to a determination that the outstanding access requests include a realtime outstanding access request that is associated with a respective completion deadline that is earlier than an estimated outstanding access request service time. In some of these embodiments, the estimated outstanding access request service time is determined from a combination (e.g., a summation) of worst-case service times of all the outstanding access requests.

If the information storage system is saturated (FIG. 5, block 56), the scheduling system 10 looks for the first realtime access request listed in the realtime queue 36 (FIG. 5, block 58). If there are no realtime access requests listed in the realtime queue 36 (FIG. 5, block 60), the scheduling system 10 returns to block 52; otherwise the scheduling system 10 determines whether the first realtime access request is in danger of missing its completion deadline (FIG. 5, block 62). In this process, the scheduling system 10 determines that the first realtime pending access request is in danger of missing its completion deadline if it is associated with a given submission deadline that is earlier than a current service time for the first realtime pending access request. In some of embodiments, the current service time is determined from a combination (e.g., a summation) of worst-case service times of all the outstanding access requests. If the first realtime pending access request is in danger of missing its completion deadline, the scheduling system 10 submits the first realtime pending access request (FIG. 5, block 64), and updates the number of outstanding requests and updates the scan position register 23 with the last scan position address of the information storage system 18 (FIG. 5, block 66); otherwise, the scheduling system 10 returns to block 52 without submitting any of the pending access requests.

If the information storage system is not saturated (FIG. 5, block 56), the scheduling system 10 searches the scan queues 38 and 40, starting from the highest priority scan queue 38 and proceeding in order of descending priority (i.e., ascending priority level value) and, for each scan queue, the scheduling system 10 searches the pending access requests in order from lowest target address to highest target address to find the target address that is nearest a current scan position of the information storage system 18 (FIG. 5, block 68). The nearest target address typically corresponds to the target address that would be accessed first by the information storage system given the last scan position of the moving-head disk drive mechanism 24. In the illustrated embodiments, the nearest target address is the first target address identified by the process of block 68 that is above the last scan position stored in the scan position register 23.

If a pending access request is not found by the process of block 68 (FIG. 5, block 70), the scheduling system 10 returns to block 52. Otherwise, the scheduling system 10 looks for the first realtime access request from the realtime queue 36 (FIG. 5, block 72). In this process, when there are multiple realtime access requests with the same completion deadline, then the scheduling system selects from that subset of realtime requests with identical deadlines the realtime access request that is associated with a target address that is nearest a current scan position of the information storage system 18.

If a realtime access request is found in block 72 (FIG. 5, block 74) and the first realtime request and the nearest pending access request are the same (FIG. 5, block 75), the scheduling system submits the realtime request to the information storage system 18 (FIG. 5, block 78), updates the number of outstanding requests and the scan position register 23 with the last scan position address of the information storage system 18 (FIG. 5, block 66), and returns to block 52.

If a realtime access request is found in block 72 (FIG. 5, block 74) and the first realtime request and the nearest pending access request are different (FIG. 5, block 75), the scheduling system 10 determines whether or not the retrieved realtime access request is in danger of missing its respective completion deadline (FIG. 5, block 76). In this process, the scheduling system 10 determines that the first realtime pending access request is in danger of missing its completion deadline if it is associated with a given submission deadline that is earlier than a current service time for the first realtime pending access request plus a worst-case service time respectively associated with the nearest pending access request found in block 68. In some of embodiments, the current service time for the first realtime pending access request is determined from a combination (e.g., a summation) of worst-case service times of all the outstanding access requests. If the retrieved realtime access request is in danger of missing its respective completion deadline (FIG. 5, block 76), the scheduling system 10 submits the retrieved realtime access request to the information storage system 18 (FIG. 5, block 78). Otherwise, the scheduling system 10 submits to the information storage system 18 the nearest realtime access request selected from the scan queue in block 68 (FIG. 5, block 80). The scheduling system 10 then updates the number of outstanding requests, updates the scan position register 23 with the last scan position address of the information storage system 18 (FIG. 5, block 66), and returns to block 52.

If a realtime access request is not found in block 72 (FIG. 5, block 74), the scheduling system 10 submits to the information storage system 18 the nearest realtime access request selected from the scan queue in block 68 (FIG. 5, block 80). The scheduling system 10 then updates the number of outstanding requests and the scan position register 23 (FIG. 5, block 66).

III. Exemplary Operating Environments

A. Overview

Embodiments of the scheduling system 10 may be implemented by one or more discrete modules (or data processing components) that are not limited to any particular hardware, firmware, or software configuration. In the illustrated embodiments, the modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (e.g., machine-readable code, such as computer software) for implementing the methods that are executed by the embodiments of the scheduling system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the scheduling system 10 may be implemented in any one of a wide variety of electronic devices, including desktop and workstation computers, printers, scanners, and other electronic devices.

B. A First Exemplary Image Processing System Architecture

Figure 6:
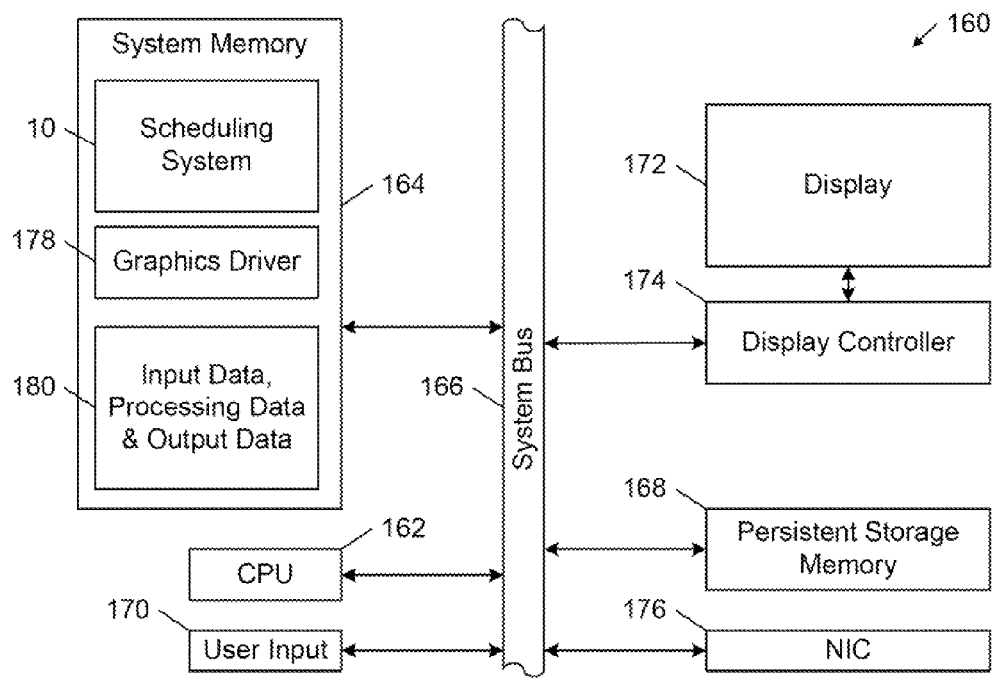
FIG. 6 is a block diagram of an embodiment of a computer system that incorporates an embodiment of the scheduling system of FIG. 1.

FIG. 6 shows an embodiment of a computer system 160 that incorporates any of the embodiments of the scheduling system 10 described herein. The computer system 160 includes a processing unit 162 (CPU), a system memory 164, and a system bus 166 that couples processing unit 162 to the various components of the computer system 160. The processing unit 162 typically includes one or more processors, each of which may be in the form of any one of various commercially available processors. The system memory 164 typically includes a read only memory (ROM) that stores a basic input/output system (BIOS) that contains start-up routines for the computer system 160 and a random access memory (RAM). The system bus 166 may be a memory bus, a peripheral bus or a local bus, and may be compatible with any of a variety of bus protocols, including PCI, VESA, Microchannel, ISA, and EISA. The computer system 160 also includes a persistent storage memory 168 (e.g., a hard drive, a floppy drive, a CD ROM drive, magnetic tape drives, flash memory devices, and digital video disks) that is connected to the system bus 166 and contains one or more computer-readable media disks that provide non-volatile or persistent storage for data, data structures and computer-executable instructions.

A user may interact (e.g., enter commands or data) with the computer 160 using one or more input devices 170 (e.g., a keyboard, a computer mouse, a microphone, joystick, and touch pad). Information may be presented through a graphical user interface (GUI) that is displayed to the user on a display monitor 172, which is controlled by a display controller 174. The computer system 160 also typically includes peripheral output devices, such as speakers and a printer. One or more remote computers may be connected to the computer system 160 through a network interface card (NIC) 176.

As shown in FIG. 6, the system memory 164 also stores the scheduling system 10, a GUI driver 178, and a database 180 containing input data, intermediate processing data, and output data. In some embodiments, the scheduling system 10 interfaces with the GUI driver 178 and the user input 170 to control the operation of the scheduling system 10.

C. A Second Exemplary Image Processing System Architecture

Figure 7:
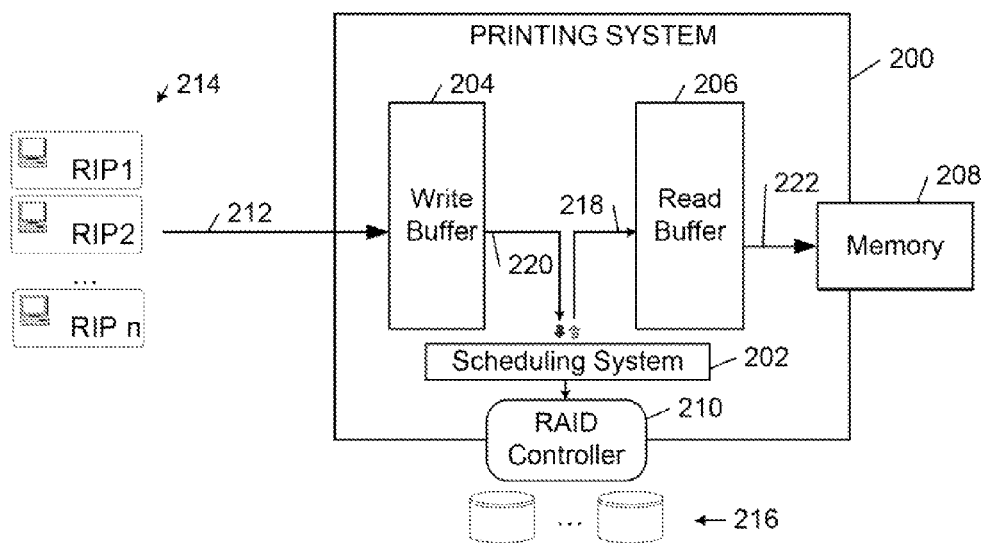
FIG. 7 is a block diagram of an embodiment of a printer system that incorporates an embodiment of the scheduling system of FIG. 1.

FIG. 7 shows an embodiment of a printing system 200 that includes an embodiment 202 of the scheduling system 10, a write buffer 204, a read buffer 206, a memory 208, and a RAID controller 210. The printing system 200 receives write access requests 212 from a set of applications 214 (i.e., RIP 1, RIP 2, . . . , RIP n). In order to maximize disk throughput, the printing system 200 builds a large queue of I/O requests and uses the scheduling system 202 to re-order the requests so as to optimize performance. The printing system 200 submits prefetch requests 218 with real-time deadlines for all the elements in each sheet to be printed, well in advance of the sheet being printed, thereby leveraging solution and application-level information not available to the low-level devices. These prefetch requests 218 allocate space in the buffer cache 206 and submit realtime read requests to the disk queue information storage system 216. The actual sheet printing process involves iterating through the list of elements in the sheet and copying data 222 from the buffer cache to the memory 208. RIP application writes 212 are absorbed by the buffer cache 204, which then creates a disk write request 220 and submits it to the disk queue information storage system 216.

This architecture allows the RIP applications 214 to proceed as soon as the data is absorbed by the buffer cache 204, allowing the RIP applications 214 to run at full speed, except when the buffer cache 204 is full and then they are automatically throttled to the available disk bandwidth because they will wait for free space in the buffer cache. The architecture also ensures that the printing system 200 never has to wait for disk reads because the scheduling system 202 ensures that writes do not interfere with the real-time requests. Finally, the architecture maximizes performance because the scheduling system 10 submits the requests in an optimal fashion to the information storage system 216, except when the real-time constraints require otherwise.

IV. Conclusion

The embodiments that are described herein provide a realtime information storage system access request scheduling algorithm that allows multiple outstanding access requests to be sent to the device, while still tracking and managing the realtime deadlines and accounting for the time potentially required by outstanding access requests that are still pending at the information storage system. These embodiments can improve the performance of storage array based information storage systems that can service multiple access requests in parallel by proper scheduling of the parallel requests. These embodiments also can improve the performance of information storage systems that support command queuing (e.g., NCQ or TCQ) and utilize efficient disk scheduling algorithms that take into account the rotational position of the storage disk.

Other embodiments are within the scope of the claims.

The invention claimed is:

1. A method of scheduling access requests to an information storage system, the access requests comprising realtime access requests and non-realtime access requests, the realtime access requests being associated with respective completion deadlines, and the method being performed by a physical data processing device and comprising:
  receiving pending ones of the access requests that are awaiting submission to the information storage system;
  tracking outstanding ones of the access requests that have been submitted to the information storage system and are awaiting completion by the information storage system; and
  submitting the pending access requests to the information storage system based on rules that prioritize the submission of pending access requests such that realtime ones of the pending access requests and realtime ones of the outstanding access requests will be serviced by the information storage system by their associated completion deadlines, comprising:
    in response to determining that the outstanding access requests include a realtime one of the outstanding access requests associated with a respective completion deadline earlier than an estimated outstanding access request time, submitting a given realtime one of the pending access requests associated with a given submission deadline earlier than a current service time for the given realtime pending access request.

2. The method of claim 1, wherein the submitting further comprises:
  in response to determining that the outstanding access requests include the realtime one of the outstanding access requests associated with the respective completion deadline earlier than the estimated outstanding access request service time, omitting submission of any other ones of the pending access requests to the information storage system.

3. The method of claim 2, further comprising:
  determining the estimated outstanding access request service time from a combination of worst-case service times of all the outstanding access requests;
  determining the current service time for the given realtime pending access request from the combination of worst-case service times of all the outstanding access requests; and
  determining the given submission deadline based on the completion deadline associated with the given realtime pending access request and a worst-case service time associated with the given realtime pending access request.

4. The method of claim 2, wherein the realtime and non-realtime access requests are associated with respective target addresses in the information storage system, and the submitting comprises:
  in response to a determination that none of the realtime outstanding access requests is associated with a respective completion deadline that is earlier than the estimated outstanding access request service time,
    selecting a respective non-realtime one of the pending access requests associated with a respective target address that is nearest a current scan position of the information storage system; and
  if a given one of the realtime pending access requests is associated with a given submission deadline that is earlier than a current service time for the given realtime pending access request plus a worst-case service time of the selected non-realtime pending access request, then sending the realtime pending access request to the information storage system,
  otherwise sending the selected non-realtime pending access request to the information storage system.

5. The method of claim 4, further comprising:
  determining the given submission deadline based on the completion deadline associated with the given realtime pending access request, and a worst-case service time associated with the given realtime pending access request; and determining the current service time for the given realtime pending access request from a combination of worst-case service times of all the outstanding access requests.

6. The method of claim 4, wherein the selecting is based on priority levels respectively associated with the pending access requests.

7. The method of claim 1, further comprising maintaining:
a pending request queue containing a list of ones of the pending access requests;
a realtime pending request queue containing a list of all realtime ones of the pending access requests; and
an outstanding access request queue containing a list of all the tracked outstanding access requests.

8. The method of claim 7, wherein the realtime and non-realtime access requests are associated with respective target addresses in the information storage system;
further comprising for each of the realtime pending access requests, determining a respective submission deadline based on the completion deadline associated with the realtime pending access request and a worst-case service time respectively associated with the realtime pending access request; and
wherein the maintaining comprises maintaining the pending request queue sorted by the target addresses respectively associated with the pending access requests, and maintaining the realtime pending access request queue sorted primarily by the submission deadlines respectively associated with the realtime pending access requests and secondarily by the target addresses respectively associated with the realtime pending access requests.

9. The method of claim 8, further comprising comparing an earliest one of the completion deadlines respectively associated with the outstanding access requests in the outstanding access request queue to a combination of worst-case service times of all the outstanding access requests in the outstanding access request queue.

10. The method of claim 9, further comprising
in response to a determination that the earliest completion deadline of the outstanding access requests occurs before the combination of worst-case service times of all the outstanding access requests, submitting to the information storage system only one or more selected realtime ones of the pending access requests that are associated with respective submission deadlines that are earlier than respective worst-case service times for the selected realtime pending access requests and omitting submission of any other ones of the pending access requests.

11. The method of claim 9, further comprising:
selecting a respective one of the realtime pending access requests listed in the realtime pending access request queue;
selecting a respective non-realtime one of the pending access requests listed in the pending access request queue;
in response to a determination that the earliest completion deadline of the outstanding access requests occurs after the combination of worst-case service times of all the outstanding access requests,
submitting the selected realtime pending access request to the information storage system if the submission deadline of the selected realtime pending access request is earlier than a combination of worst-case service times of all the outstanding access requests and a worst-case service time respectively associated with the selected non-realtime pending access request,
otherwise submitting the selected non-realtime pending access request to the information storage system.

12. The method of claim 11, wherein the maintaining comprises maintaining a pending request queue containing a list of ones of the pending access requests that are different from the pending access requests that are listed in the first pending request queue, the first and second pending request queues are associated with respective priority level values, and the selecting of the non-realtime pending access request comprises searching the first and second pending request queues in order of their associated priority level values.

13. The method of claim 1, wherein the submitting comprises submitting a respective one of the pending access requests to the information storage system only in response to receipt of either a new pending access request or a notification that a respective one of the outstanding access requests has been serviced by the information storage system.

14. Apparatus for scheduling access requests to an information storage system, the access requests comprising realtime access requests and non-realtime access requests, the realtime access requests being associated with respective completion deadlines, and the apparatus comprising:
a computer-readable medium storing computer-readable instructions; and
a data processor coupled to the computer-readable medium, operable to execute the instructions, and based at least in part on the execution of the instructions operable to perform operations comprising
receiving pending ones of the access requests that are awaiting submission to the information storage system;
tracking outstanding ones of the access requests that have been submitted to the information storage system and are awaiting completion by the information storage system; and
submitting the pending access requests to the information storage system based on rules that prioritize the submission of pending access requests such that realtime ones of the pending access requests and realtime ones of the outstanding access requests will be serviced by the information storage system by their associated completion deadlines,
wherein, in the submitting, the data processor is operable to perform operations comprising:
in response to determining that the outstanding access requests include a realtime one of the outstanding access requests associated with a respective completion deadline earlier than an estimated outstanding access request time, submitting a given realtime one of the pending access requests associated with a given submission deadline earlier than a current service time for the given realtime pending access request.

15. The apparatus of claim 14, wherein, in the submitting, the data processor is operable to perform operations further comprising:
in response to determining that the outstanding access requests include the realtime one of the outstanding access requests associated with the respective completion deadline earlier than the estimated outstanding access request service time, omitting submission of any other ones of the pending access requests to the information storage system.

16. The apparatus of claim 14, wherein, based at least in part on execution of the instructions, the data processor is operable to perform operations comprising maintaining:
- a pending request queue containing a list of ones of the pending access requests;
- a realtime pending request queue containing a list of all realtime ones of the pending access requests; and
- an outstanding access request queue containing a list of all the tracked outstanding access requests.

17. At least one non-transitory computer-readable medium having computer-readable program code embodied therein, the computer-readable program code adapted to be executed by a computer to implement a method of scheduling access requests to an information storage system, the access requests comprising realtime access requests and non-realtime access requests, the realtime access requests being associated with respective completion deadlines, and the method comprising:
- receiving pending ones of the access requests that are awaiting submission to the information storage system;
- tracking outstanding ones of the access requests that have been submitted to the information storage system and are awaiting completion by the information storage system; and
- submitting the pending access requests to the information storage system based on rules that prioritize the submission of pending access requests such that realtime ones of the pending access requests and realtime ones of the outstanding access requests will be serviced by the information storage system by their associated completion deadlines, comprising:
  - in response to determining that the outstanding access requests include a realtime one of the outstanding access requests associated with a respective completion deadline earlier than an estimated outstanding access request time, submitting a given realtime one of the pending access requests associated with a given submission deadline earlier than a current service time for the given realtime pending access request.

18. The computer-readable medium of claim 17, wherein the submitting further comprises:
- in response to determining that the outstanding access requests include the realtime one of the outstanding access requests associated with the respective completion deadline earlier than the estimated outstanding access request service time, omitting submission of any other ones of the pending access requests to the information storage system.

19. The computer-readable medium of claim 18, wherein the realtime and non-realtime access requests are associated with respective target addresses in the information storage system, and the program code is adapted to be executed by the computer to implement the method comprising:
- in response to a determination that none of the realtime outstanding access requests is associated with a respective completion deadline that is earlier than the estimated outstanding access request service time,
  - selecting a respective non-realtime one of the pending access requests associated with a respective target address that is nearest a current scan position of the information storage system; and
  - if a given one of the realtime pending access requests is associated with a given submission deadline that is earlier than a current service time for the given realtime pending access request plus a worst-case service time of the selected non-realtime pending access request, then sending the realtime pending access request to the information storage system,
  - otherwise sending the selected non-realtime pending access request to the information storage system.

20. The computer-readable medium of claim 17, wherein the program code is adapted to be executed by the computer to implement the method comprising maintaining:
- a pending request queue containing a list of ones of the pending access requests;
- a realtime pending request queue containing a list of all realtime ones of the pending access requests; and
- an outstanding access request queue containing a list of all the tracked outstanding access requests.

* * * * *